UNITED STATES PATENT OFFICE.

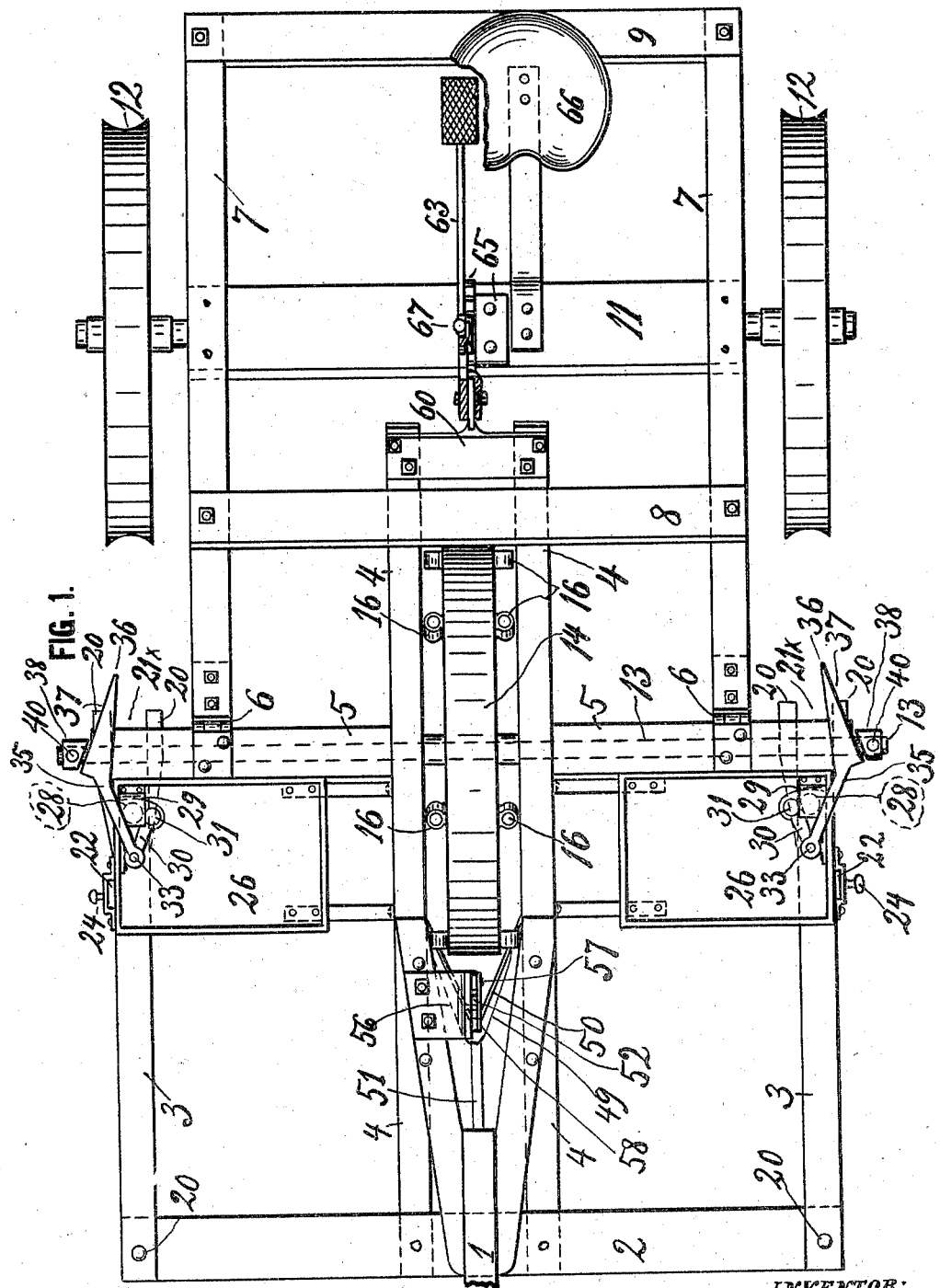

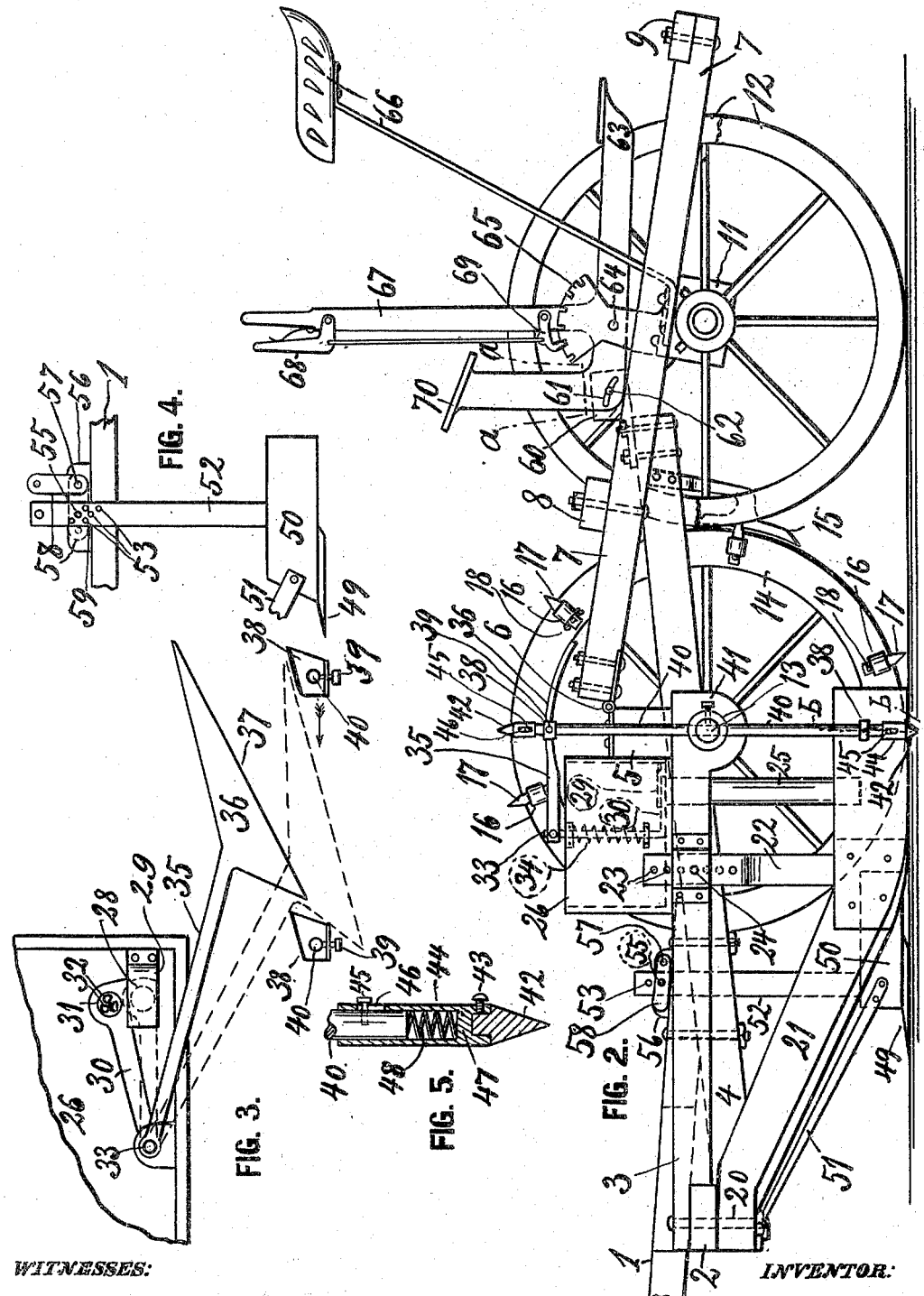

JOSEPH C. COLEMAN, OF NEW ALBIN, IOWA.

CORN-PLANTER.

947,799.  Specification of Letters Patent.  Patented Feb. 1, 1910.

Application filed September 28, 1908. Serial No. 455,069.

*To all whom it may concern:*

Be it known that I, JOSEPH C. COLEMAN, a citizen of the United States, residing at New Albin, in the county of Alamakee and State of Iowa, have invented a new and useful Corn-Planter, of which the following is a specification.

My invention relates to planting machines and more particularly to corn planters of the kind drawn by horses or other animals and designed to plant two rows of corn simultaneously; and the main object is to provide a planter that will plant the corn certain distances apart without the use of a check line stretched across the field and operating the seed dropping mechanism, as is commonly used with the so-called check-row planters.

With this and other objects in view my invention consists of the novel construction and arrangement of parts illustrated in the accompanying drawing, in which—

Figure 1 is a top or plan view of my improved corn planter with the foot rest 70 intersected at *a—a* in Fig. 2. Fig. 2 is a side elevation of the machine with the upper half of the left hind wheel broken away to expose the frame work. Fig. 3 is an enlarged portion of the lower part of Fig. 1. Fig. 4 is a side elevation of a leveler mounted in front of the front ground wheel of the machine and the means by which it is held at different depths. Fig. 5 is an enlarged section on the line *b—b* in Fig. 2.

Referring to the drawing by reference numerals a draft pole 1 is rigidly fixed to a hopper or front frame formed of a cross bar 2, side bars 3 and inner longitudinal bars 4 secured to the side bars by cross bars 5 to which is hinged at 6 a rear seat or wheel frame comprising a front cross bar 8, a rear cross bar 9 and the side bars 7, the latter being secured upon the axle 11 which has at each end a grooved supporting wheel 12.

In the front frame is journaled a shaft 13 which may be tubular as shown having fixed upon its middle a traction wheel 14, which has a plain cylindrical face kept clean by a scraper 15 secured on the frame work and being of equal width to the face of the wheel.
At each side of said wheel are provided sockets 16 adapted to hold calks 17, which may be secured by cotter pins 18, or otherwise made detachable.

Pivoted at 20 to the front corners of the hopper frame are the usual runners or furrow openers 21 having each a gap 21ˣ in its rear end for the corn to drop through into the groove formed by the V-shaped bottom of the runner. Said runners may be adjusted vertically to different depths in the ground by a vertical arm 22 having apertures 23 and a pin 24 therein inserted in a hole in the frame. The seed or corn is dropped through tubes 25 from hoppers 26 mounted upon the frame and having each a dropping mechanism constructed and operated as follows.

In the bottom of the hopper is an aperture 28 (see Fig. 3) directly above the tube 25 and covered by a plate or cut-off 29 secured at one end to the hopper bottom and standing say about one third of an inch above the bottom. Between this plate and the hopper bottom swings horizontally a flat arm or carrier 30 having an aperture 31 adapted to receive a few grains of corn 32 and carry the same in under the plate and drop them into the tube 25. The arm 30 is operated by being secured on a vertical rock shaft 33 journaled in one side of the hopper and provided with a spring 34 tending at all times to turn the shaft with the arm 30 over the feed tube 25. To the upper end of the rock shaft is fixed a rocker arm 35 carrying a cam 36 having an inclined face 37 against which acts a block 38 held by a screw 39 near each end of a bar 40, which is passed transversely through the adjacent end of the shaft 13 and secured therein by a screw 41 so as to form two radial arms. Said block 38 moves or swings the cam arm inward and allows the corn to fall into the aperture 31, and as the block or finger 38 passes the broad end of the cam the spring swings the arm quickly into position for dropping the corn, and at the same time a mark is made in the ground by the lower end of the rod 40, or rather by a prong 42 (see Fig. 5) held by a screw 43 in a socket 44 which is slidingly placed on the end of the rod where it is retained by a screw 45 passed through a slot 46 in the side of the socket and secured in the bar 40, while between the end of the bar and a bottom 47 of the socket is interposed an expanding coil spring 48, which is to yield if the prong 42 strikes a stone or other hard object in the ground. The marks thus made by the prongs 42 serve to guide the operator as to the position the planter and its planting mechanism is to occupy in starting the next row on the field, so that the plants will get into straight rows in transverse position to the rows planted by driving the machine over the field. The width between the latter rows is determined by the width between the runners 3 and also by the distance from either runner to the usual marker (not shown) that is dragged by the machine on the ground the desired distance from either side thereof, and the distance between the transverse rows is regulated by the circumference of the traction wheel 14, which is of such a size that half of its circumference marks the distance usually desired between the plants or rows. Should an unusual distance be desired an extra sized wheel is furnished and substituted for the common size.

In order to give the traction wheel an even road to travel on and thus insure accuracy of distances between the plants I provide in front of the wheel a ground leveling device consisting of share 49 and mold boards 50 adapted to spread the dirt trimmed off by the share. This device is drawn by a bar 51 secured to the front end of the hopper frame while its depth in the ground is regulated by a vertical rod 52 secured to the device and having near its upper end holes 53, either of which may go upon a peg 55 secured in a bracket 56 mounted on the frame work and having pivoted to it at 57 a latch 58 adapted to be dropped in front of the bar and rest upon a lug 59 after the bar is adjusted to the desired height. Such regulation of the leveler may also serve to sink the traction wheel so deep as to thereby regulate the depth at which the runners are to work and the seed is to be dropped.

The rear wheels 12 are grooved as usually in such machines and travel in line with the droppers so as to cover up the dropped grain.

At the rear end of the longitudinal frame bars 4 of the hopper frame is secured a bracket 60 having a solt 61 engaged by a pin 62 of a foot lever 63 fulcrumed at 64 to a bracket 60 having a slot 61 engaged by a pin 11 near the driver's seat 66. Upward from the foot lever extends a hand lever 67 having a finger lever 68 and dog 69 actuated thereby and engaging the notched sector, while at the front end of the foot lever is a foot rest 70 for the driver's feet to rest on while the planter is in ordinary operation. When, however, it is desired to turn the machine to the right or left on the field, the driver places one foot on the lever 63 and after releasing the dog 69 by lever 68 he pulls on lever 67 besides stepping on lever 63, and thereby raises the hopper or front frame, runners and wheel 14 from the ground, the pole and the horses holding up the front end of the hopper frame; and by allowing the dog 69 to engage in the notches of the sector 65, the hopper frame may remain elevated for any desired period, to give ample time to turn the machine on the ground or to rotate the front wheel by hand so as to bring the markers 42 into proper position to the marks they have previously made on the field. The calks or prongs 17 may be removed where the condition of the ground and other circumstances are such that the traction wheel will not slip on the ground when operating the droppers.

I do not wish nor mean to limit my invention to the use of the blocks 38, cams 36 and rocker arms 35, nor the exact dropping means shown as these devices represent only one embodiment of my invention and may be much varied without diverging from the scope and spirit of the invention.

What I claim is:

1. In a corn planter of the kind described, the combination of a hopper frame, groove-making runners secured thereto, hoppers mounted on the frame and a dropping device in each hopper adapted to drop corn in the rear of the runners, and means for covering the corn after it is dropped; a transverse supporting shaft journaled in the hopper frame and extending beyond the sides of it, a traction wheel fixed at the middle of the shaft and means provided on the ends of the shaft for actuating the dropping devices whenever the traction wheel has rolled forward a certain distance on the ground being planted.

2. In a corn planter of the kind described, the combination of a hopper frame, groove-making runners secured thereto, hoppers mounted on the frame and a dropping device in each hopper adapted to drop corn in the rear of the runners, and means for covering the corn after it is dropped; a transverse supporting shaft journaled in the hopper frame and extending beyond the sides of it, a traction wheel fixed to the middle of the shaft and means provided on the ends of the shaft for actuating the dropping devices whenever the traction wheel has rolled forward a certain distance on the ground being planted, and a ground leveling device secured to the hopper frame and disposed in front of the traction wheel.

3. In a corn planter of the kind described, the combination of a hopper frame, groove-making runners secured thereto, hoppers mounted on the frame and a dropping device in each hopper adapted to drop corn in the rear of the runners, and means for covering the corn after it is dropped; a transverse supporting shaft journaled in the hopper frame and extending beyond the sides of it, a traction wheel fixed to the middle of the shaft and means provided on the ends of the shaft for actuating the dropping devices whenever the traction wheel has rolled forward a certain distance on the ground being planted, and a ground leveling device secured to the hopper frame and disposed in front of the traction wheel and means for raising and lowering said leveling device in the frame.

4. In a corn planter of the kind described, the combination of a hopper frame, groove-making runners secured thereto, hoppers mounted on the frame and a dropping device in each hopper adapted to drop corn in the rear of the runners, and means for covering the corn after it is dropped; a transverse supporting shaft journaled in the hopper frame and extending beyond the sides of it, a traction wheel fixed to the middle of the shaft and means provided on the ends of the shaft for actuating the dropping devices whenever the traction wheel has rolled forward a certain distance on the ground being planted, said means on the ends of the shaft consisting of radial arms and blocks or fingers thereon adapted to contact with a cam on each dropping device in passing the same, said dropping devices having each a cam adapted to receive motion from said fingers.

5. In a corn planter of the kind described, the combination of a hopper frame, groove-making runners secured thereto, hoppers mounted on the frame and a dropping device in each hopper adapted to drop corn in the rear of the runners, and means for covering the corn after it is dropped; a transverse supporting shaft journaled in the hopper frame and extending beyond the sides of it, a traction wheel fixed to the middle of the shaft and means provided on the ends of the shaft for actuating the dropping devices whenever the traction wheel has rolled forward a certain distance on the ground being planted, said means on the ends of the shaft consisting of radial arms and blocks or fingers thereon adapted to contact with a cam on each dropping device in passing the same, said dropping devices having each a cam adapted to receive motion from said fingers, and a marking prong at the outer end of each radial arm for the purpose set forth.

6. A corn planter having a hopper frame with hoppers thereon, a dropping device in each hopper with an operating arm extending therefrom, a transverse shaft journaled in the frame and extending beyond the sides of it, a traction wheel fixed at the middle of the shaft and being of such size that half of its circumference equals the distance between the hills being planted, a rod secured transversely at each end of the shaft so as to form two radial arms, one of which operates the arm of the dropper when the other is directed against the ground, and a marker at the outer end of each arm.

7. A corn planter having a hopper frame with hoppers thereon, a dropping device in each hopper with an operating arm extending therefrom, a transverse shaft journaled in the frame and extending beyond the sides of it, a traction wheel fixed to the middle of the shaft and being of such size that half of its circumference equals the distance between the hills planted, a rod secured transversely at each end of the shaft so as to form two radial arms, one of which operates the arm of the dropper when the other is directed against the ground, and a marker at the outer end of each arm, said marker being slidingly mounted on the arm and provided with a spring that allows it to yield if a hard object in the ground is struck.

8. A corn planter having a hopper frame with hoppers thereon, a dropping device in each hopper with an operating arm extending therefrom, a transverse shaft journaled in the frame and extending beyond the sides of it, a traction wheel fixed to the middle of the shaft and being of such size that half of its circumference equals the distance between the hills being planted, a rod secured transversely at each end of the shaft to form two radial arms, one of which operates the arm of the dropper when the other is directed against the ground, and a marker at the outer end of each arm, said marker being slidingly mounted on the arm and provided with a spring that allows it to yield if a hard object in the ground is struck, said markers having detachable points to allow their removal and replacing.

9. In a corn planter of the kind described, the combination of a hopper frame, groove-making runners secured thereto, hoppers mounted on the frame and a dropping device in each hopper adapted to drop corn in the rear of the runners, and means for covering the corn after it is dropped; a transverse supporting shaft journaled in the hopper frame and extending beyond the sides of it, a traction wheel fixed at the middle of the shaft and means provided on the shaft for actuating the dropping devices whenever the traction wheel has rolled forward a certain distance on the ground being planted, said traction wheel having sockets at its sides and calks or prongs detachably secured therein and projecting beyond the face of the wheel.

10. In a corn planter of the kind described, the combination of a hopper frame, groove-making runners secured thereto, hoppers mounted on the frame and a dropping device in each hopper adapted to drop corn in the rear of the runners, and means for covering the corn after it is dropped; a transverse supporting shaft journaled in the hopper frame and extending beyond the sides of it, a traction wheel fixed to the middle of the shaft and means provided on the shaft for actuating the dropping devices whenever the traction wheel has rolled forward a certain distance on the ground being planted, a seat frame hinged to the rear end of the hopper frame, a driver's seat mounted thereon, an axle and wheels supporting the seat frame, a notched sector mounted on the axle, a combined hand and foot lever fulcrumed on the sector and having a finger-operated lever and a dog operated thereby and adapted to engage in the notches of the sector, the forward end of said lever being pivotally and slidingly connected with the rear end of the hopper frame.

11. In a corn planter of the kind described the combination of a hopper frame, groove-making runners secured thereto, hoppers mounted on the frame and a dropping device in each hopper adapted to drop corn in the rear of the runners, and means for covering the corn after it is dropped; a transverse supporting shaft journaled in the hopper frame, a traction wheel fixed to the middle of the shaft and means provided on the shaft for actuating the dropping devices whenever the traction wheel has rolled forward a certain distance on the ground being planted, a seat frame hinged to the rear end of the hopper frame, a driver's seat mounted thereon, an axle and wheels supporting the seat frame, a notched sector mounted on the axle, a combined hand and foot lever fulcrumed on the sector and having a finger-operated lever and a dog operated thereby and adapted to engage in the notches of the sector, the forward end of said lever being pivotally and slidingly connected with the rear end of the hopper frame, and having an upwardly projecting arm with a foot rest thereon for the driver.

12. In a corn planter of the kind described, the combination of a hopper frame, groove-making runners secured thereto, hoppers mounted in the frame and a dropping device in each hopper adapted to drop corn in the rear of the runners, and means for covering the corn after it is dropped; a transverse supporting shaft journaled in the hopper frame, a traction wheel fixed to the middle of the shaft and means provided on the shaft for actuating the dropping devices whenever the traction wheel has rolled forward a certain distance on the ground being planted, and means for raising and lowering the rear ends of the runners.

In testimony whereof I affix my signature, in presence of two witnesses.

JOSEPH C. COLEMAN.

Witnesses:
 Hy Wuennerke,
 L. H. Gaarder.